United States Patent
Carey

(10) Patent No.: US 10,757,032 B2
(45) Date of Patent: *Aug. 25, 2020

(54) METHODS, APPARATUSES AND COMPUTER-READABLE STORAGE MEDIUMS FOR COMMUNICATION VIA USER SERVICES PLATFORM

(71) Applicant: Nokia of America Corporation, Murray Hill, NJ (US)

(72) Inventor: Timothy A. Carey, Murray Hill, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,279

(22) Filed: Apr. 15, 2019

(65) Prior Publication Data

US 2019/0245802 A1 Aug. 8, 2019

Related U.S. Application Data

(62) Division of application No. 15/586,368, filed on May 4, 2017, now Pat. No. 10,320,694.

(51) Int. Cl.
*H04L 12/805* (2013.01)
*H04L 29/08* (2006.01)
*H04L 12/863* (2013.01)

(52) U.S. Cl.
CPC ............ *H04L 47/36* (2013.01); *H04L 47/628* (2013.01); *H04L 67/16* (2013.01); *H04L 67/12* (2013.01)

(58) Field of Classification Search
CPC ....................................................... H04L 47/36
See application file for complete search history.

(56) References Cited

U.S. PATENT DOCUMENTS

| | | | | |
|---|---|---|---|---|
| 6,061,820 A * | 5/2000 | Nakakita | ........... | H03M 13/2915 370/395.65 |
| 6,349,099 B1 * | 2/2002 | Larikka | .............. | H04Q 11/0478 370/395.1 |
| 6,438,603 B1 * | 8/2002 | Ogus | ...................... | H04L 47/10 370/238 |
| 6,490,284 B1 * | 12/2002 | Graf | .................. | H04Q 11/0478 370/395.2 |

(Continued)

FOREIGN PATENT DOCUMENTS

WO   WO-2015/14336   9/2015

OTHER PUBLICATIONS

International Search Report and Written Opinion dated Jul. 31, 2018 in International Application No. PCT/US2018/030072.

(Continued)

*Primary Examiner* — Andrew Lai
*Assistant Examiner* — Andrew C Lee
(74) *Attorney, Agent, or Firm* — Harness, Dickey & Pierce, P.L.C.

(57) ABSTRACT

An originating User Services Platform (USP) endpoint segments a payload representing a USP message into smaller segments (also referred to as "fragments" or "chunks") for transmission of the payload through intermediate proxies having different message size constraints. Upon receipt, a receiving USP endpoint reassembles the smaller segments to recover the payload representing the USP message.

30 Claims, 7 Drawing Sheets

(56) References Cited

U.S. PATENT DOCUMENTS

| | | | | |
|---|---|---|---|---|
| 6,826,181 | B1* | 11/2004 | Higashida | H04Q 11/0478 370/390 |
| 7,433,368 | B2* | 10/2008 | Feith | H04Q 3/0025 370/466 |
| 9,544,356 | B2 | 1/2017 | Cuomo et al. | |
| 10,320,694 | B2* | 6/2019 | Carey | H04L 47/36 |
| 2003/0061365 | A1* | 3/2003 | White | G06F 21/6218 709/229 |
| 2004/0073703 | A1* | 4/2004 | Boucher | H04L 69/16 709/245 |
| 2005/0055708 | A1* | 3/2005 | Gould | H04N 7/163 725/25 |
| 2009/0193074 | A1* | 7/2009 | Lee | G06F 21/51 709/203 |
| 2010/0124196 | A1* | 5/2010 | Bonar | H04B 7/0689 370/329 |
| 2016/0057070 | A1 | 2/2016 | Saxena et al. | |
| 2018/0083781 | A1* | 3/2018 | Kaliski, Jr. | H04L 61/1594 |

OTHER PUBLICATIONS

C. Bormann, Universitaet Bremen TZI, "Adaptation Layer Fragmentation Indication; draft-bormann-intarea-alfi-04", Standrdworkingdraft, Internet Society (ISOC) 4, Sep. 9, 2013, Geneva, Switzerland.

Jason Walls et al., "TR-369 User Services Platform (USP)", Technical Report, Broadband Forum, Apr. 12, 2018, US.

* cited by examiner

| Element | Type | Description |
| --- | --- | --- |
| version | string | Version of the USP Record |
| from_id | string | Originating USP Endpoint Identifier |
| session_id | uint64 | For reliable message exchange. Session context identifier, used to identify the USP session context and / or TLS session. |
| sequence_id | uint64 | For reliable message exchange. Datagram sequence identifier. Initialized to zero and incremented after each sent USP Record. |
| expected_id | uint64 | For reliable message exchange. Next sequence_id the sender is expecting to receive. Implicitly acknowledges to the recipients all transmitted datagrams less than expected_id. |
| payload_encoding | enum | When the payload is present, the encoding protocol used encode and decode the unencrypted, reassembled payload. Valid values are:<br>0-Unencoded<br>1-Google protobuf |
| payload_encryption | enum | When the payload is present, the security protocol use to encrypt the USP Message<br>0-Unencrypted<br>1-TLS<br>2-COSE |
| payload_sar_state | enum | Indicates status of segmentation and reassembly at transmitting endpoint. Valid values are:<br>0-No segmentation<br>1-Begin<br>2-in-process<br>3-complete |
| payload_rec_sar_state | enum | Indicates status of segmentation and reassembly of payload records within a payload (initiated, in-progress, complete) at transmitted endpoint. Valid values are:<br>0-Reserved (Unused)<br>1-Begin<br>2-in-process<br>3-complete |
| payload | bytes | One or more payload records |
| retransmit_id | uint64 | Request for USP Record retransmission. Used for reliable message exchange. |

FIG. 6

METHODS, APPARATUSES AND COMPUTER-READABLE STORAGE MEDIUMS FOR COMMUNICATION VIA USER SERVICES PLATFORM

CROSS-REFERENCE TO RELATED APPLICATIONS

This application is a Divisional Application of, and claims priority under 35 U.S.C. § 120 to, U.S. application Ser. No. 15/586,368, filed on May 4, 2017, now U.S. Pat. No. 10,320,694, the entire contents of which are incorporated herein by reference.

BACKGROUND

Field

One or more example embodiments relate to methods, apparatuses and/or computer-readable storage mediums for communication via the User Services Platform (USP).

Discussion of Related Art

The User Services Platform (USP) includes a network of controllers and agents, which allow applications to manipulate service elements, wherein a service element reflects some functionality exposed by a device. The manipulation of a service element is done through the exchange of USP messages using the USP protocol.

SUMMARY

One or more example embodiments provide mechanisms for an originating User Services Platform (USP) endpoint to segment a payload representing a USP message into smaller segments (also referred to as "fragments" or "chunks") that permit transmission of the payload through Message Transfer Protocol (MTP) proxies having different message size constraints, and for a receiving USP endpoint to reassemble the smaller segments into the larger payload upon receipt. This process is sometimes referred to herein as a segmentation and reassembly (SAR) function.

At least one example embodiment provides an electronic device comprising: a memory storing computer-readable instructions; one or more processors coupled to the memory; and a transceiver coupled to the one or more processors. The one or more processors are configured to execute the computer-readable instructions to: segment a payload representing a User Services Platform message to generate a plurality of payload segments; and generate a sequence of User Services Platform records based on the plurality of payload segments, each of the User Services Platform records including (i) a payload segment from among the plurality of payload segments and (ii) segmentation and reassembly state information indicating a state of segmentation of the payload at the electronic device when the included payload segment was generated. The transceiver is configured to transmit the sequence of User Services Platform records.

At least one other example embodiment provides an electronic device, comprising a transceiver and one or more processors coupled to the transceiver. The transceiver is configured to receive a sequence of a plurality of User Services Platform records, each of the plurality of User Services Platform records including (i) a payload segment representing a portion of a User Services Platform message, and (ii) segmentation and reassembly state information indicating a state of segmentation of a payload into payload segments at an originating endpoint device. The one or more processors are configured to execute computer-readable instructions to: buffer the plurality of User Services Platform records; and recover the User Services Platform message by reassembling the payload segments of the plurality of User Services Platform records in the buffer in response to receiving a User Services Platform record including segmentation and reassembly state information indicating that segmentation of the payload at the originating endpoint device is complete.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 6 illustrates a USP Record structure according to an example embodiment.

Figure 1:
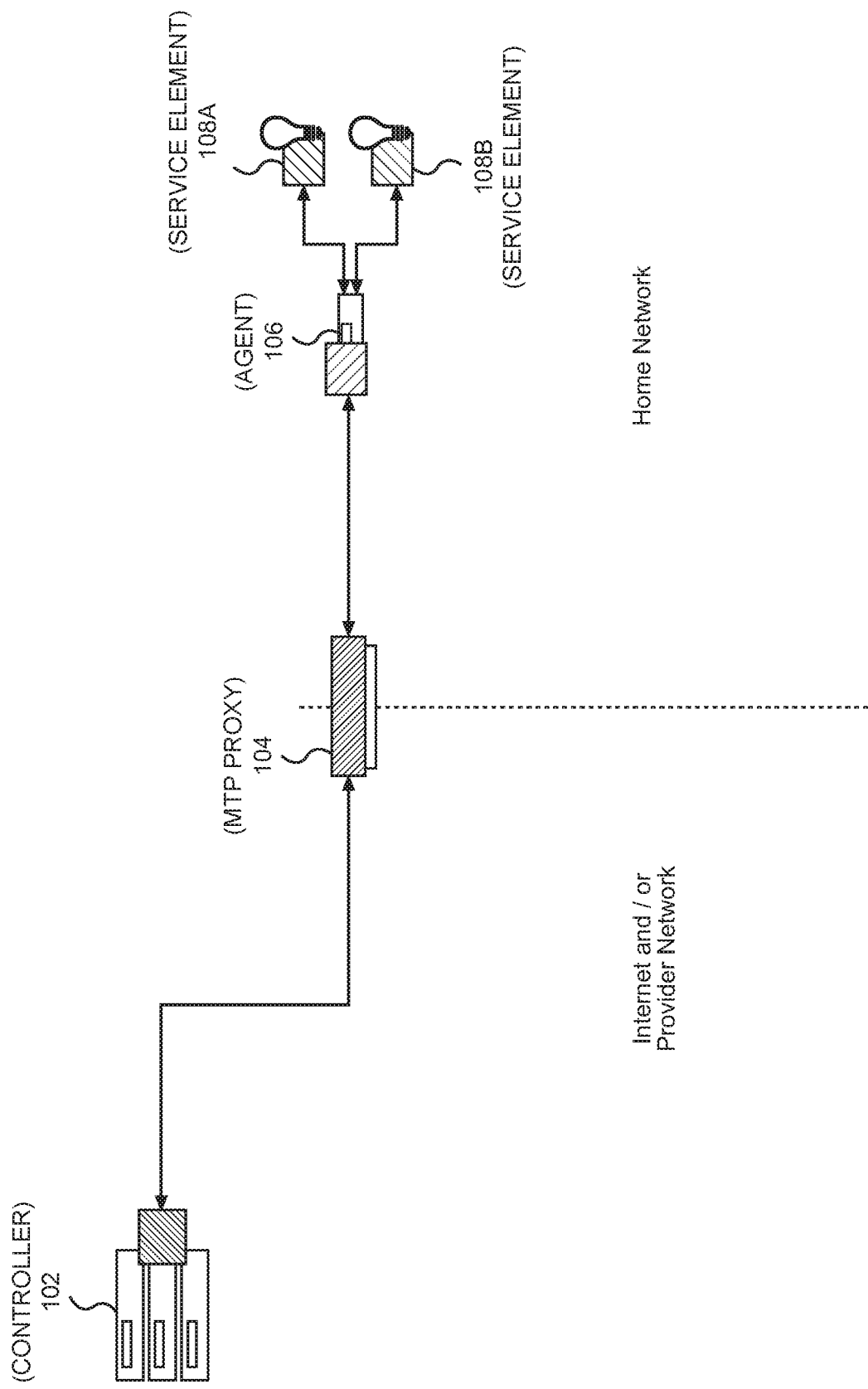
FIG. 1 is a block diagram illustrating a portion of an example User Services Platform (USP) network architecture.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments will be described from the perspective of the controllers, agents, or other applicable electronic devices, it will be understood that one or more example embodiments discussed herein may be performed by the one or more processors (or processing circuitry) at the applicable device.

FIG. 1 is a block diagram illustrating a portion of an example User Services Platform (USP) network architecture.

As shown in FIG. 1, the portion of the USP network architecture includes a controller 102, a Message Transfer Protocol (MTP) proxy 104, an agent 106, and proxy service elements 108A, 108B. The controller 102, the MTP proxy 104 and the agent 106 may communicate via one or more MTPs. In one example, the controller 102 may communicate with the MTP proxy 104 via the Simple (or Streaming) Text Oriented Message Protocol (STOMP), whereas the agent 106 may communicate with the MTP proxy 104 via the Constrained Application Protocol (CoAP). The agent 106 may communicate with the proxy service elements 108A, 108B via a high-level communication protocol such as ZigBee, Z-Wave, or the like.

Although FIG. 1 illustrates only a single controller 102, a single MTP proxy 104, a single agent 106, and two proxy service elements 108A, 108B, example embodiments should not be limited to this example. Rather, a USP network architecture may include a network of controllers, MTP proxies, agents and proxy service elements. Moreover, although discussed with regard to an MTP proxy, example embodiments should not be limited to this example. Rather, other intermediate proxies may be used.

The agent 106 is a USP endpoint that exposes the service elements 108A and 108B to the controller 102. The controller 102 is an USP endpoint that manipulates the service elements 108A and 108B through the agent 106. In the example shown in FIG. 1, the agent 106 exposes the service elements 108A and 108B to the controller 102 through a MTP proxy 104.

Example controllers include network service provider controllers (ACS), application service provider controllers, and smartphone controllers (e.g., inside or outside a home network). However, example embodiments should not be limited to these examples. Example agents include smart home gateways, SmartTVs, and the like.

A proxy service element represents a piece of service functionality exposed by an agent, and may be represented by one or more objects. Examples of proxy service elements include home automation devices, such as lights, locks, thermostats, and the like.

Still referring to FIG. 1, the controller 102 and the agent 106 allow applications to manipulate the service elements 108A, 108B through the exchange of USP messages via the MTP proxy 104 using the USP protocol. These applications include traditional management systems, a user portal or a managed entity that provides Internet-of-Things services, and may act as a user portal in the cloud on a gateway or accessed through a smartphone, as part of an automated smart home or intelligent building system.

A USP message refers to the contents of a USP layer communication including a message header and a message body. The message body may include, for example, a Request, Response or Error. The message header may include elements that provide information regarding the message, such as an endpoint identifier of the sender and receiver, the message type, and message identification (Message ID) elements. A Message ID is an identifier used to associate a Response or Error with a Request.

Although the network shown in FIG. 1 includes a proxy mechanism in the form of the MTP proxy 104, example embodiments should not be limited to this example. According to one or more other example embodiments, an agent may expose one or more service elements to a controller directly and without a proxy mechanism.

Controllers, agents and/or proxies, such as those shown in FIG. 1, may be deployed in various configurations where the controllers and agents communicate across the Internet (or service provider networks), or within a local network (e.g., within the home). Regardless of the deployment configuration, when a controller and agent exchange USP messages via the USP protocol, exchange of the USP messages may require transfer across networks using a variety of MTPs.

A MTP is at the layer below the USP protocol, which carries a message between an originating USP endpoint (also referred to as an originating USP endpoint device, an originating endpoint, an originating endpoint device, or the like) and a receiving USP endpoint (also referred to as a receiving USP endpoint device, a receiving endpoint, a receiving endpoint device). Originating USP endpoints and receiving USP endpoints may also be collectively referred to as electronic devices. Examples of MTPs include STOMP, CoAP, Hyper-Text-Transfer-Protocol (HTTP), and Extensible Messaging and Presence Protocol (XMPP).

In more complex deployments, an originating USP endpoint (e.g., controller 102) may communicate USP messages to a receiving USP endpoint (e.g., agent 106) across one or more MTP proxies, which forward the USP messages between the endpoints that use different MTPs.

In FIG. 1, for example, the controller 102 is deployed in a service provider's network outside the home network (e.g., Local Area Network (LAN)) in which the agent 106 is located. In this example, as mentioned above, the agent 106 communicates with the MTP proxy 104 via CoAP and the controller 102 communicates with the MTP proxy 104 via STOMP. Thus, USP messages exchanged between the controller 102 and the agent 106 traverse multiple MTPs. In these scenarios, End-to-End (E2E) message exchange capabilities of the USP permit the exchange of USP messages in a more secure and/or reliable manner through the use of USP Records.

USP Records are defined as transport layer payloads, which encapsulate a sequence of datagrams that constitute (or represent) a USP message as the payload portion of the USP Record. USP Records also provide additional metadata to enable secure and reliable delivery of individual segments (also referred to as fragments) of the USP message. This additional metadata will be discussed in more detail later with regard to FIG. 6.

To suppress the likelihood that transmissions of USP Records are blocked and/or dropped, one or more example embodiments provide the ability to segment and reassemble unencrypted, encoded or encrypted payloads (e.g., including a USP message or multiple entities (e.g., Transport Layer Security (TLS) entities) representing a USP message, which have sizes greater than a smallest maximum transmission unit (MTU) for one or more MTPs between an originating USP endpoint and a receiving USP endpoint. A MTU is the largest size packet or frame that can be sent over a particular network.

Segmentation and reassembly (SAR) may be employed independently or in combination with the known security and reliability E2E message exchange. For example, larger unencrypted USP messages may be exchanged in a more reliable manner using the SAR function while smaller USP messages may still maintain the same reliability if the SAR function was not employed.

At least some example embodiments provide methods for transmitting USP messages in which an originating USP endpoint segments a payload representing a USP message into segments of M bytes, wherein M may be a size of a smallest MTU from among MTUs for the MTPs traversed between the originating USP endpoint and the receiving USP endpoint. In an example in which the MTU is associated with STOMP, M may be 225 bytes. Upon receiving all segments of the segmented payload, the receiving USP endpoint reassembles the payload segments to recover the original payload representing the USP message included therein.

FIG. 6 illustrates an example structure of a USP Record.

Referring to FIG. 6, the USP Record may include: a version; an originating USP endpoint identifier (from_id); a session context identifier (session_id); a datagram sequence identifier (sequence_id); an expected sequence identifier (expected_id); payload encoding information (payload_encoding); payload encryption information (payload_encryption); a payload segmentation and reassembly (SAR) state (payload_sar_state); and a payload record SAR state (payload_rec_sar_state); a payload; and a retransmit identifier (retransmit_id). As discussed herein, the payload may be referred to as the payload portion of the USP Record, which represents a USP message. The remaining metadata portions of the USP Record may be referred to as the non-payload portion of the USP Record. Although discussed herein as including each of the fields shown in FIG. 6, a USP Record need not include all of the non-payload portion shown in FIG. 6. Moreover, a USP Record need not carry a payload in at least some contexts.

Still referring to FIG. 6, the version indicates the version of the USP Record. The from_id identifies the originating USP endpoint having generated and transmitted the USP Record. The session_id includes information identifying the E2E Session Context (Session Context) established between the originating USP endpoint and the receiving USP endpoint.

A Session Context is established between two USP endpoints by sending a USP Record with a session_id value, which is not currently associated with the USP endpoint combination. In the USP, an agent initiates the process of establishing a Session Context between USP endpoints, and the Session Context is uniquely identified within the agent by the combination of the value of the session_id and the associated controller's USP identifier.

A Session Context may have a lifetime and may expire after expiration of a given (or, alternatively, desired or predetermined) time period. The expiration of the Session Context may be controlled by a Session Context Expiration (SessionContextExpiration) parameter at an agent, wherein if the agent does not see activity (e.g., an exchange of USP Records) within the Session Context for a given time period, the agent considers the Session Context expired.

Once a Session Context is established between USP endpoints, USP Records are created to exchange payloads (and USP messages) within the Session Context. USP Records are uniquely identified by their from_id, session_id and sequence_id.

Still referring to FIG. 6, the sequence_id may be initialized to zero for the first USP Record in the sequence of USP Records transmitted in the Session Context, and incremented after each USP Record in the sequence is sent. According to at least some example embodiments, endpoints may maintain independent values for the sequence_id, based on the number of sent records.

The expected_id indicates the next sequence identifier, which the originating USP endpoint is expecting to receive from the receiving USP endpoint. Receipt of a sequence_id matching the expected_id implicitly acknowledges receipt of all transmitted datagrams having a sequence_id less than the expected_id.

The payload portion of a USP record, which represents a USP message, may include one or more payload records. A USP message may be unencrypted, encrypted using Concise Binary Object Representation (CBOR) Object Signing and Encryption (COSE), or encrypted using Transport Layer Security (TLS) encryption. However, example embodiments should not be limited to these examples. In an example in which the USP message is a larger unencrypted USP message (or a USP message encrypted with COSE), the payload portion may include a payload record, which represents the USP message. In another example, the payload portion may be comprised of multiple entities (e.g., TLS records) where each entity (e.g., TLS record) constitutes a payload record.

Still referring to FIG. 6, the payload_encoding includes an identification of the encoding protocol used to encode (and decode) an unencrypted payload. Valid values of the payload encoding information include unencoded ('0') and encoded ('1').

The payload_encryption includes the security protocol (e.g., COSE, TLS, or the like) used to encrypt the USP message to generate the payload portion.

The payload_sar_state is indicative of a state of the segmentation and reassembly for the payload at the originating USP endpoint. Example values for the payload_sar_state include "no segmentation" (e.g., '0'), "begin" (e.g., '1'), "in-process" (e.g., '2'), and "complete" ('3').

The payload_rec_sar_state is indicative of the state of the segmentation and reassembly for a given payload record within the payload. Example values for the payload_rec_sar_state include "unused" (e.g., '0'), "begin" (e.g., '1'), "in-process" (e.g., '2'), and "complete" (e.g., '3').

As discussed herein, the payload_sar_state and the payload_rec_sar_state may be collectively referred to as segmentation and reassembly state information (or segmentation and reassembly state indicator information). The payload SAR state (payload_sar_state) may be referred to herein as a payload segmentation and reassembly state and may indicate a state of segmentation of a payload at an originating endpoint device when a given payload segment was generated. The payload record SAR state (payload_rec_sar_state) may be referred to as a payload record segmentation and reassembly state, and may indicate a state of segmentation of a payload record at an originating endpoint device when a given payload segment was generated.

The retransmit_id includes a request for retransmission of the USP Record for reliable message exchange. The retransmit_id is included or set when a retransmission is requested.

Figure 3:
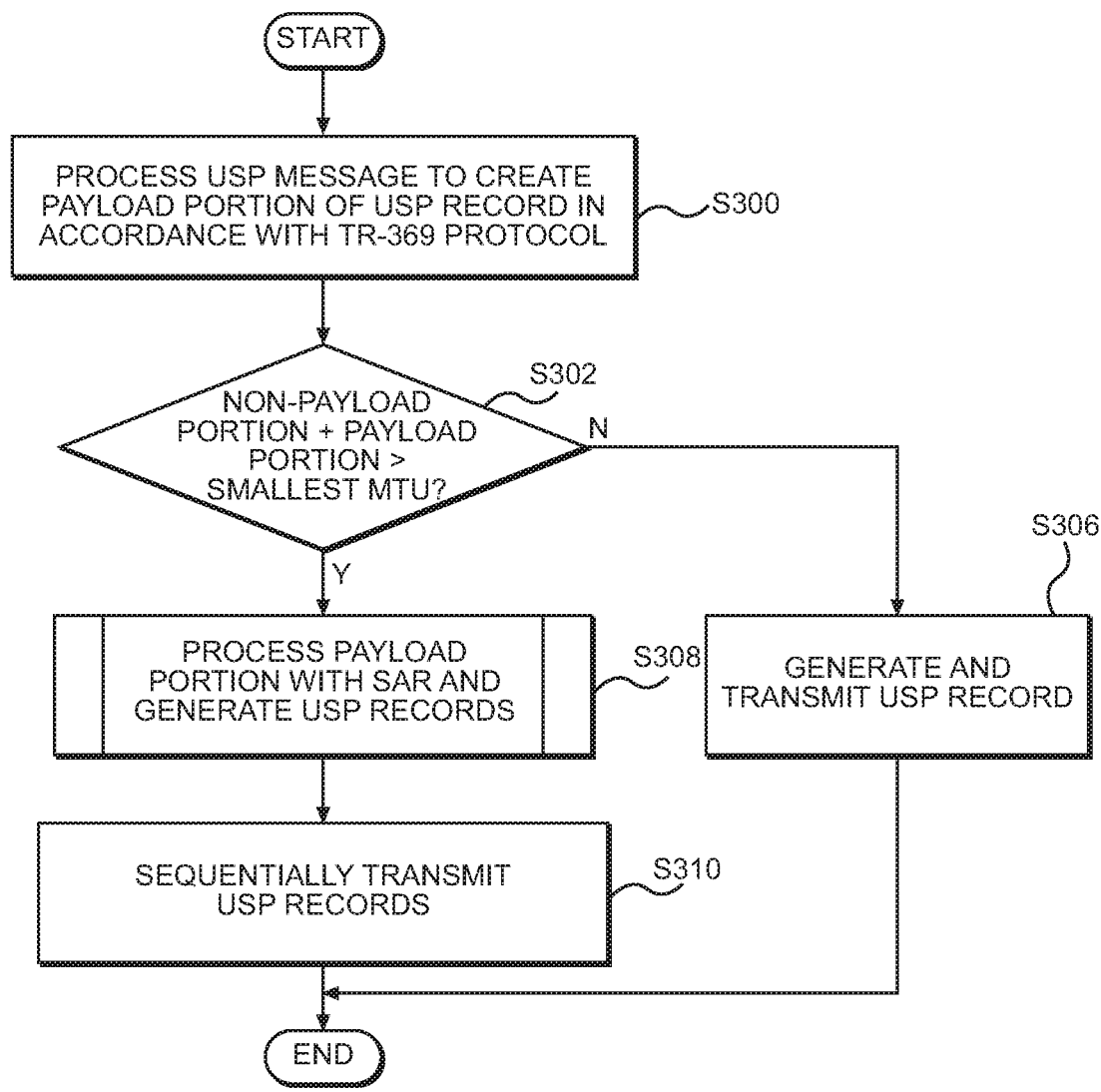
FIG. 3 is a flow chart illustrating an example embodiment of a method for generating and transmitting USP Records.

FIG. 3 is a flow chart illustrating an example embodiment of a method for generating and transmitting USP Records.

For example purposes, the example embodiment shown in FIG. 3 will be described with regard to a Session Context established between the controller 102 (serving as the originating USP endpoint) and the agent 106 (serving as the receiving USP endpoint). It should be understood, however, that example embodiments should not be limited to this example.

Referring to FIG. 3, at step S300 the controller 102 processes (e.g., encodes and/or encrypts) a USP message to generate a payload portion of a USP Record for transmission to the agent 106. In one example, the controller 102 processes the USP message in accordance with the TR-369 protocol. The generated payload portion may be stored in a payload transmit buffer at the controller 102.

As mentioned above, according to one or more example embodiments, the payload portion that represents the USP message may include one or more payload records. For example, the payload portion may include a payload record including an unencrypted USP Message, a COSE encrypted payload record, or multiple payload records, each of which includes a TLS encrypted entity. However, example embodiments should not be limited to these examples.

Returning to FIG. 3, at step S302 the controller 102 determines whether the estimated size (e.g., in bytes) of a USP Record (including a non-payload portion and the payload portion created at step S300) is greater than the smallest MTU for MTPs traversed between the controller 102 and the agent 106.

If the estimated size of the USP Record is less than or equal to the smallest MTU for the MTPs (e.g., STOMP and CoAP) between the controller 102 and agent 106 at step S302, then the controller 102 determines that segmentation and reassembly (SAR) of the payload portion created at step S300 is not necessary. In this case, the controller 102 generates and transmits a USP Record for transmission to the agent 106 at step S306. For example, at step S306, the controller 102 encapsulates the payload portion created at step S300 and the non-payload portion in the USP Record (e.g., having a structure such as that shown in FIG. 6).

Returning to step S302, if the estimated size of the USP Record is greater than the smallest MTU for the MTPs between the controller 102 and the agent 106, then at step S308 the controller 102 processes the payload portion with a segmentation and reassembly (SAR) function to generate a sequence of payload segments, each of the payload segments including at least a segment (or fragment) of a payload record (and consequently at least a portion of a USP message) in the payload portion. Depending on the size of the payload portion and the payload records contained therein, the controller 102 may segment (or fragment) the payload portion (and/or the one or more payload records within the payload portion) into smaller "chunks" (also referred to herein as payload segments or fragments) such that USP Records including a payload segments and the non-payload portion of the USP Record have sizes less than or equal to the smallest MTU. In one example, for transfer to the agent 106 in FIG. 1, the controller 102 may segment a payload portion into segments of less than 225 bytes (e.g., between 150 and 200 bytes) because the MTU for STOMP is 225 bytes, which is the smallest MTU among the MTUs for MTPs between the controller 102 and the agent 106.

Also at step S308, the controller 102 generates a sequence of USP Records, each including a generated payload segment, for transmission to the agent 106. The controller 102 may generate each USP Record in the sequence in a manner similar to that discussed above with regard to step S306, except that the respective payload portions of the USP Records are the payload segments.

A more detailed discussion of the application of the SAR function and generation of the sequence of USP Records at step S308 will be provided later with regard to FIG. 5.

Returning to FIG. 3, at step S310 the controller 102 sequentially transmits the USP Records generated at step S308 to the agent 106 (e.g., via the MTP proxy 104) to convey the USP message.

Figure 5:
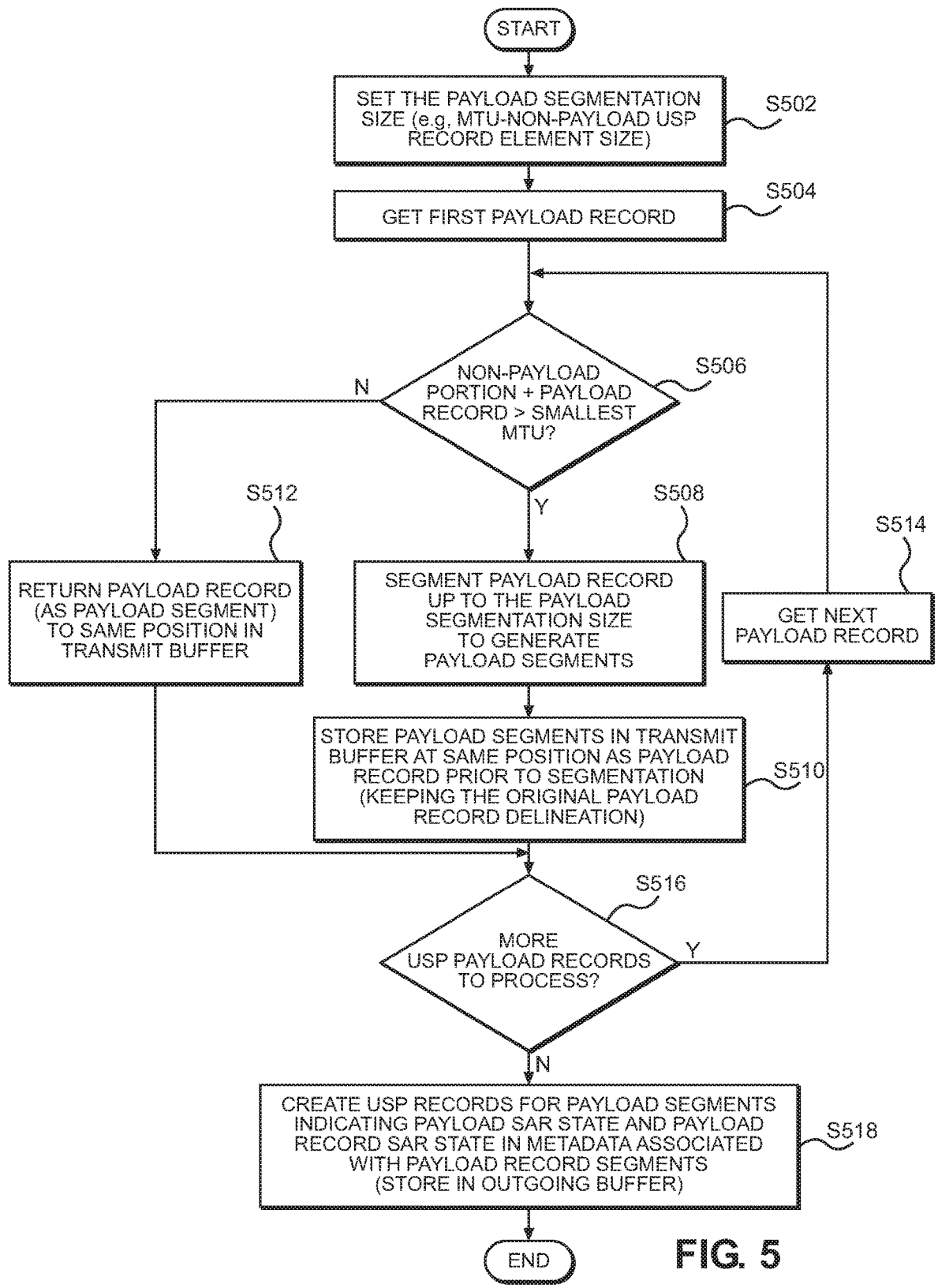
FIG. 5 is a flowchart illustrating an example embodiment of a method for processing a payload portion to generate payload segments and USP Records.

FIG. 5 is a flowchart illustrating an example embodiment of a method for processing a payload portion to generate payload segments and then USP Records for transmission. As with FIG. 3, for example purposes, the example embodiment shown in FIG. 5 will be described with regard to the Session Context established between the controller 102 and the agent 106. It should be understood, however, that example embodiments should not be limited to this example.

Referring to FIG. 5, at step S502 the controller 102 sets the payload segmentation size for the payload portion of the USP Record (generated at step S300) based on a size of the non-payload portion of the USP Record and the smallest MTU for the MTPs between the controller 102 and the agent 106. In one example, the controller 102 may set the payload segmentation size as the difference between the size of the smallest MTU and the size of non-payload portion. In the example mentioned above, if the MTU for STOMP is 225 bytes and the size of the non-payload portion of the USP Record is 25 bytes, then the segmentation size for the payload portion may be 200 bytes.

At step S504, the controller 102 obtains the first payload record of the payload portion from the payload transmit buffer.

At step S506, the controller 102 determines whether the estimated size (e.g., in bytes) of a USP Record including the non-payload portion and the obtained payload record is greater than the smallest MTU for the MTPs between the controller 102 and the agent 106.

If the controller 102 determines that the estimated size of the USP Record is less than or equal to the smallest MTU, then the controller 102 returns the payload record as a payload segment to the payload transmit buffer at step S512. In so doing, the controller 102 returns the payload segment to the same position in the payload transmit buffer as previously occupied by the payload record when obtained at step S504.

At step S516, the controller 102 determines whether the payload transmit buffer includes additional payload records to be processed. That is, for example, the controller 102 determines whether the processing of the payload portion with the SAR function is complete.

If the controller 102 determines that the payload transmit buffer includes additional payload records to be processed, then at step S514 the controller 102 obtains the next payload record from the payload transmit buffer. The process then returns to step S506 and continues as discussed herein.

Returning to step S516, if the controller 102 determines that the payload transmit buffer does not include any additional payload records to be processed (processing of the payload portion with the SAR function is complete), then the controller 102 generates (or, alternatively, creates) a USP Record corresponding to each of the payload segments in the payload transmit buffer so as to generate the sequence of USP Records for transmission to the agent 106. Also at step S518, the controller 102 sets the payload SAR state (payload_sar_state) and the payload record SAR state (payload_rec_sar_state) in the non-payload portion of the generated USP Record(s). The controller 102 then stores the generated one or more USP Records in an outgoing transmit buffer for sequential transmission to the agent 106.

For each USP Record, the payload SAR state and the payload record SAR state may be set based on a state of segmentation of the payload portion when the payload segment included in the USP Record was created. For example, a first USP Record including first payload segment of a payload portion may have a payload SAR state of "begin," whereas a USP Record including a last payload segment of a payload portion may have a payload SAR state of "complete." One or more USP Records including payload segments between the first payload segment and the last payload segment may have a payload SAR state of "in-process."

Similarly, a USP Record including a payload segment corresponding to a first portion of a segmented payload record may have a payload record SAR state of "begin," and a USP Record including a payload segment corresponding to a last portion of a segmented payload record may have a payload record SAR state of "complete." One or more USP Records including payload segments corresponding to portions of a segmented payload record between the first portion and the last portion may have a payload record SAR state of "in-process."

A more specific example of setting payload SAR states and payload record SAR states will be discussed later.

Returning to step S506 in FIG. 5, if the controller 102 determines that the estimated size of a USP Record including the non-payload portion and the payload record obtained from the payload transmit buffer is greater than the smallest MTU, then the controller 102 segments the payload record into a sequence of a plurality of payload segments, wherein each of the plurality of payload segments has a size that is less than or equal to the payload segmentation size.

At step S510, the controller 102 stores the plurality of payload segments in the payload transmit buffer at the same position as previously occupied by the payload record in the transmit buffer prior to segmentation, such that the original delineation between payload records is maintained. The process then proceeds to step S516 and continues as discussed above.

FIG. 5 will now be described with regard to a more specific example in which a non-payload portion NP is 25 bytes, an original payload portion P is 700 bytes, and the smallest MTU is 225 bytes. In this example, the payload portion P includes a sequence of two payload records, including first payload record PR_1 of 200 bytes and a second payload record PR_2 of 500 bytes. In this example, each of the payload records may include a TLS entity, and the TLS entities represent the USP message. However, example embodiments should not be limited to this example.

Referring again to FIG. 5, at step S502 the controller 102 sets the payload segmentation size to 225−25=200 bytes.

At step S504, the controller 102 obtains the first payload record PR_1 from the payload transmit buffer.

In this example, because the estimated size of a USP Record including the first payload record PR_1 (200 bytes) and the non-payload portion NP (25 bytes) is equal to the smallest MTU (step S506), the controller 102 does not segment the first payload record PR_1. Rather, the controller 102 returns the first payload record PR_1 to the payload transmit buffer as first payload segment PR1_SEG1 at the same position from which the first payload record PR_1 was obtained (step S512).

Since the payload transmit buffer includes a second payload record PR_2 to be processed (step S516), the controller 102 obtains the second payload record PR_2 from the payload transmit buffer (step S514).

Because the estimated size of a USP Record including the second payload record PR_2 (500 bytes) and the non-payload portion NP (25 bytes) is greater than the smallest MTU (step S506), the controller 102 segments the second payload record PR_2 into a sequence of a plurality of payload segments PR2_SEG1, PR2_SEG2 and PR2_SEG3 (step S508). In this example, each of the first payload segment PR2_SEG1 and the second payload segment PR2_SEG2 has a size of 200 bytes, whereas the third payload segment PR2_SEG3 has a size of 100 bytes.

The controller 102 then stores the plurality of payload segments (in sequence order) in the payload transmit buffer in the position previously occupied by the second payload record PR_2 prior to segmentation (step S510).

In this example, since there are no other payload records to be processed with regard to the current payload portion (step S516), the controller 102 generates a sequence of USP Records USPR1, USPR2, USPR3 and USPR4 based on the payload segments PR1_SEG1, PR2_SEG1, PR2_SEG2 and PR2_SEG3 stored in the payload transmit buffer (step S518). In this example, the first USP Record USPR1 includes the payload segment PR1_SEG1 as the payload portion, the second USP Record USPR2 includes the payload segment PR2_SEG1 as the payload portion, the third USP Record USPR3 includes the payload segment PR2_SEG2 as the payload portion, and the fourth USP Record USPR4 includes the payload segment PR2_SEG3 as the payload portion. The USP Records USPR1, USPR2, USPR3 and USPR4 may have monotonically increasing sequence_id numbers such that the USP Records are processed in order of the monotonically increasing sequence_id numbers upon receipt at the agent 106. The controller 106 may generate the respective USP Records USPR1, USPR2, USPR3 and USPR4 as discussed above with regard to steps S306 and S308 in FIG. 3. Although example embodiments are discussed with regard to monotonically increasing sequence_id numbers, any manner of maintaining order of USP Records may be used.

Also at step S518, the controller 102 sets the payload SAR state and payload record SAR state for each of the generated USP Records USPR1, USPR2, USPR3 and USPR4.

In this example, for the first USP Record USPR1 (including the payload segment PR1_SEG1) in the sequence, the payload SAR state (payload_sar_state) is set to "begin" and the payload record SAR state payload_rec_sar_state is set to "unused." For the second USP Record USPR2 (including the payload segment PR2_SEG1) in the sequence, the payload SAR state is set to "in-process" and the payload record SAR state is set to "begin." For the third USP Record USPR3 (including the payload segment PR2_SEG2) in the sequence, the payload SAR state is set to "in-process" and the payload record SAR state is set to "in-process." For the fourth USP Record USPR4 (including the payload segment PR2_SEG3) in the sequence, the payload SAR state is set to "complete" and the payload record SAR state is set to "complete."

The USP Records USPR1, USPR2, USPR3 and USPR4 are then stored in an outgoing USP Record transmit buffer for sequential transmission to the agent 106 at step S310 in FIG. 3.

Through the process shown in FIG. 5, the controller 102 generates a sequence of USP Records, each of which has a size less than or equal to a smallest MTU among MTPs between the controller 102 and the agent 106. Accordingly, the likelihood that transmissions of the USP Records are blocked and/or dropped may be reduced.

At the agent 106, upon receipt of the transmitted sequence of USP Records (including a segmented payload portion) from the controller 102, the agent 106 processes the received USP Records to reassemble the segmented payload portion, and then recover the original (or transmitted) USP message.

Figure 4A:
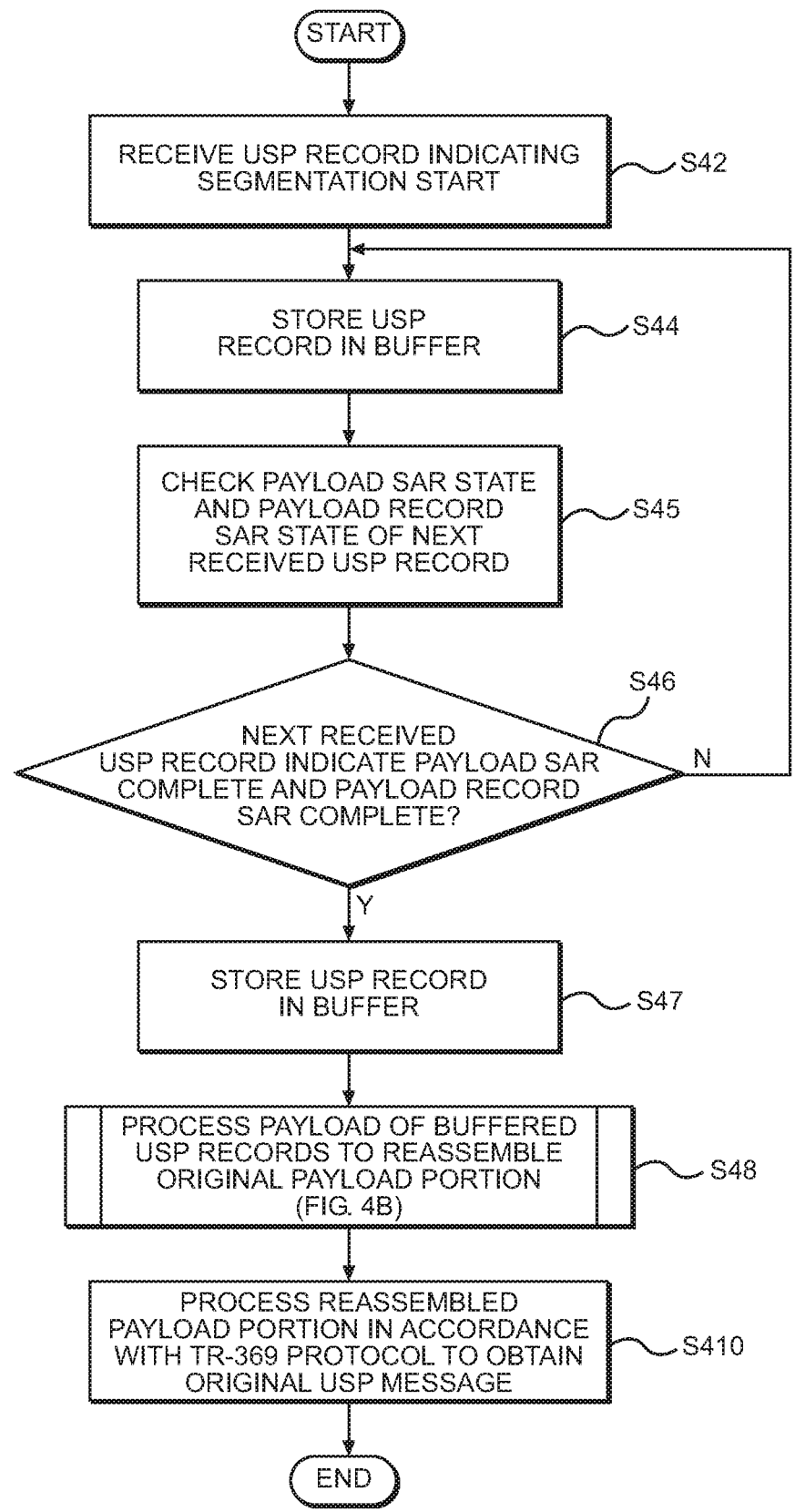
FIG. 4A is a flow chart illustrating an example embodiment of a method for receiving and processing USP Records.

FIG. 4A is a flow chart illustrating an example embodiment of a method for processing received USP Records including payload segments of a segmented payload portion. For example purposes, the example embodiment shown in FIG. 4A will again be described with regard to the Session Context established between the controller 102 and the agent 106. It should be understood, however, that example embodiments should not be limited to this example. Furthermore, the example embodiment shown in FIG. 4A will be described with regard to receipt of USP Records processed in accordance with the segmentation procedure discussed above with regard to FIGS. 3 and 5. It should understood, however, that non-segmented USP Records received at the agent 106 (e.g., USP Records having a payload SAR state set to "no segmentation" and a payload record SAR state set to "unused") may be processed as discussed with regard to step S410 in FIG. 4A without performing steps S42 through S48 in FIG. 4A.

Referring to FIG. 4A, in response to receiving a USP Record having a payload SAR state (payload_sar_state) set to "begin" at step S42, the agent 106 stores the received USP Record in a receiving USP Record buffer at step S44.

At step S45, the agent 106 checks the payload SAR state and the payload record SAR state (payload_rec_sar_state) for the next received USP Record.

If both the payload SAR state and the payload record SAR state for the next received USP Record are not set to "complete" (at least one of the payload SAR state and the payload record SAR state for the next received USP Record is set to "begin" or "in-process") at step S46, then the process returns to step S44 at which the next received USP Record is stored in the receiving USP Record buffer. The process then continues as discussed herein.

Returning to step S46, if both the payload SAR state and the payload record SAR state for the next received USP Record are set to "complete," then the agent 106 stores the next received USP Record in the receiving USP Record buffer at step S47.

Then, at step S48, the agent 106 processes the payload portion of each of the buffered USP Records to reassemble and recover the original payload portion prior to segmentation at the controller 102. According to at least some example embodiments, the agent 106 processes the payload portions of the USP Records stored in the receiving USP Record buffer according to the monotonically increasing sequence_id numbers of the USP Records from smallest to largest to reassemble the larger payload portion representing the original USP message sent by the controller 102. An example embodiment of the processing at step S48 will be discussed in more detail below with regard to FIG. 4B.

At step S410, the agent 106 processes (e.g., decodes and/or decrypts as necessary) the reassembled payload portion to recover the USP message from the controller 102. In one example, the agent 106 may process the reassembled payload portion in accordance with the TR-369 protocol to recover the original USP message.

FIG. 4A will now be discussed in more detail with regard to the example presented above in which USP Records USPR1, USPR2, USPR3 and USPR4 are sequentially transmitted by the controller 102 to the agent 106.

Referring to FIG. 4A, upon receipt of the first USP Record USPR1, which has the payload SAR state set to "begin" (step S42), the agent 106 stores the first USP Record USPR1 in the receiving USP Record buffer (step S44).

The agent 106 then checks if both the payload SAR state and the payload record SAR state for the next USP Record USPR2 are set to "complete" (step S45). Since, in this example, the next USP Record USPR2 includes a payload SAR state set to "in-process" and a payload record SAR state set to "begin" (step S46), the agent 106 stores the USP Record USPR2 in the receiving USP Record buffer (step S44).

The agent 106 then checks if both the payload SAR state and the payload record SAR state for the next USP Record USPR3 are set to "complete" (step S45). Since the next USP Record USPR3 includes a payload SAR state set to "in-process" and a payload record SAR state set to "in-process" (step S46), the agent 106 again stores the USP Record USPR3 in the receiving USP Record buffer (step S44).

The agent 106 then checks if both the payload SAR state and the payload record SAR state for the next USP Record USPR4 are set to "complete" (step S45). Since the next USP Record USPR4 includes a payload SAR state and a payload record SAR state set to "complete" (step S46), the agent 106 stores the fourth USP Record USPR4 in the receiving USP Record buffer (step S47), and then begins to process the payload portions of the USP Records USPR1, USPR2, USPR3 and USPR4 stored in the receiving USP Record buffer to reassemble the original payload portion (representing the original USP message) prior to segmentation at the controller 102 (step S48).

The agent 106 then processes (e.g., decodes and/or decrypts as necessary) the reassembled payload portion to recover the original USP message included therein (step S410).

Figure 4B:
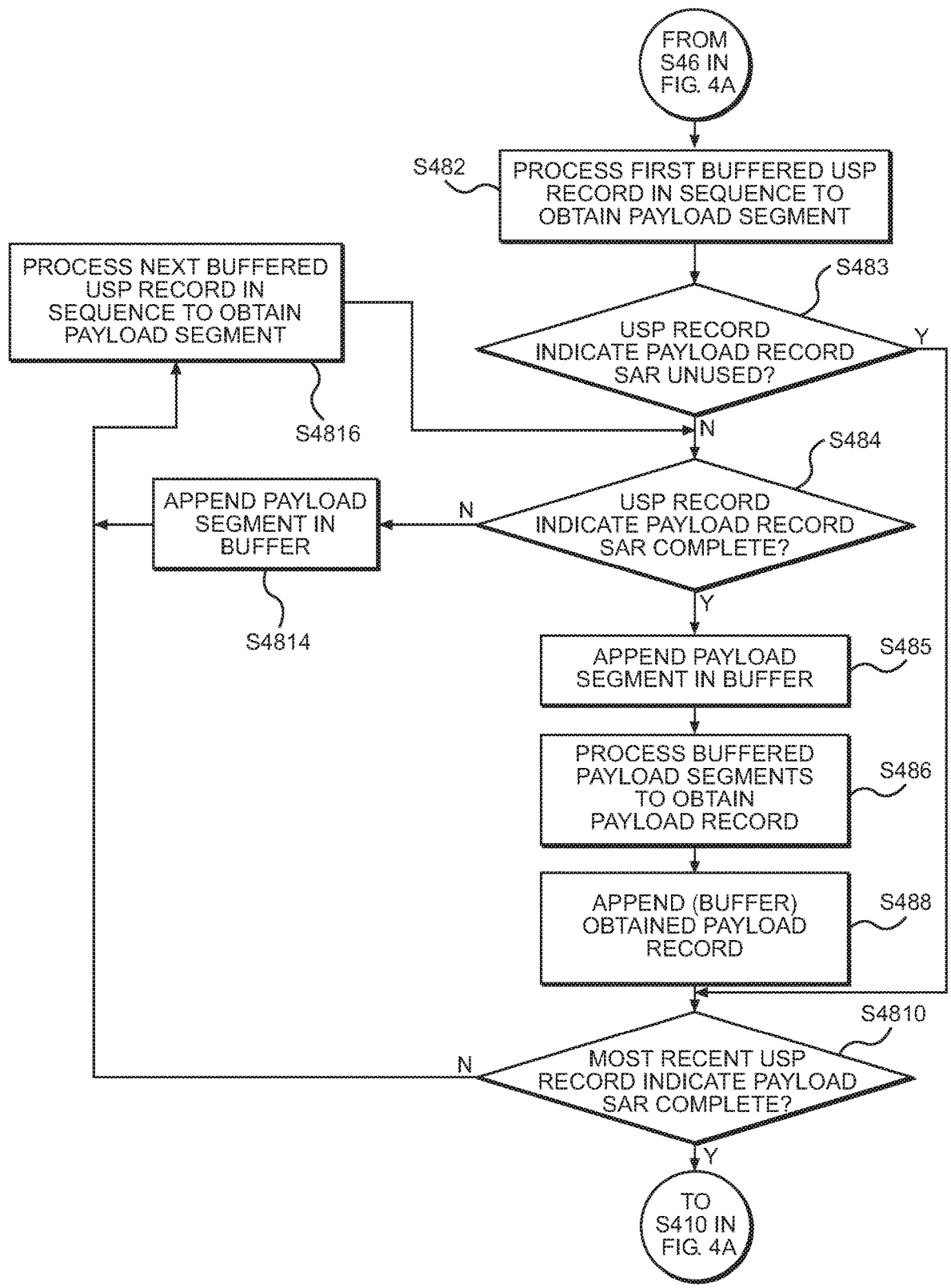
FIG. 4B is a flow chart illustrating an example embodiment of a method of processing payloads of buffered USP Records.

FIG. 4B is a flow chart illustrating an example embodiment of a method for processing buffered USP Records at step S48 in FIG. 4A.

Referring to FIG. 4B, at step S482, the agent 106 processes the first USP Record stored in the receiving USP Record buffer. In this example, the agent 106 processes the USP Record having the lowest sequence_id number among the buffered USP Records.

If the payload record SAR state of the current USP Record is not set to "unused" at step S483 or "complete" at step S484, then the agent 106 appends the payload segment in a payload segment buffer at step S4814. The agent 106 then processes the next buffered USP Record in the sequence (e.g., the buffered USP Record having the next sequence_id number in the monotonically increasing sequence numbers) at step S4816, and the process returns to step S484.

If, at step S484, the payload record SAR state for the current USP Record is set to "complete," then the agent 106 appends the payload segment obtained from the current USP Record in the payload segment buffer at step S485, and begins to process the one or more buffered payload segments at step S486 to reassemble the payload record from the original payload portion prior to segmentation. The agent 106 then appends the reassembled payload record in a payload record buffer at S488.

At step S4810, the agent 106 checks whether the payload SAR state for the most recently processed (or current) USP Record in the sequence is set to "complete."

If the payload SAR state for the most recently processed USP Record in the sequence is not set to "complete," then the process proceeds to step S4816 and continues as discussed above.

Returning to step S4810, if the payload SAR state for the most recently processed USP Record in the sequence is set to "complete," then the process proceeds to step S410 in FIG. 4A in which the reassembled payload portion (the payload records stored in the payload record buffer) is processed (e.g., decoded and/or decrypted as necessary) to recover the original USP message.

Returning now to step S483 in FIG. 4B, if the payload record SAR for the first USP Record in the buffer is set to "unused," then the agent 106 determines that the USP Record includes an unsegmented payload record (e.g., the payload segment includes a payload record). In this example, the process proceeds to step S488 at which the agent 106 stores the payload record in the payload record buffer. The process then proceeds as discussed above.

As with FIG. 4A, FIG. 4B will now be discussed in more detail with regard to the example in which USP Records USPR1, USPR2, USPR3 and USPR4 are sequentially transmitted by the controller 102 to the agent 106.

Referring to FIG. 4B, the agent 106 processes the first USP Record USPR1 in the sequence to obtain the payload segment PR1_SEG1 (step S482).

Since the payload record SAR state for the USP Record USPR1 is set to "unused" (step S483), the agent 106 stores the payload record PR_1 (included as the payload segment PR1_SEG1) in the payload record buffer (step S488).

Since the payload SAR state for the first USP Record USPR1 is set to "begin," rather than "complete" (step S4810), the agent 106 processes the next USP Record USPR2 to obtain payload segment PR2_SEG1 (step S4816).

Because the payload record SAR state for the second USP Record USPR2 is set to "begin," rather than "unused" (step S483) or "complete" (step S484), the agent 106 appends the payload segment PR2_SEG1 in the payload segment buffer (step S4818), and processes the next USP Record USPR3 to obtain the payload segment PR2_SEG2 (step S4816).

Because the payload record SAR state for the USP Record USPR3 is set to "in-process," rather than "unused" (step S483) or "complete" (step S484), the agent 106 appends the payload segment PR2_SEG2 to the payload segment PR2_SEG1 in the payload segment buffer (step S4814), and processes the next USP Record USPR4 to obtain the payload segment PR2_SEG3 (step S4816).

Because the payload record SAR state for the USP Record USPR4 is set to "complete" (step S484), the agent 106 appends the payload segment PR2_SEG3 to the payload segments PR2_SEG1 and PR2_SEG2 already in the payload segment buffer (step S485) to obtain the second payload record PR_2 (step S486).

The agent 106 then stores the obtained second payload record PR_2 in the payload record buffer (step S488).

Still referring to FIG. 4B, since the payload SAR state for the USP Record USPR4 is also set to "complete," the process proceeds to step S410 in FIG. 4A in which the reassembled payload portion P including payload records PR_1 and PR_2 in the payload record buffer are processed (e.g., decoded and/or decrypted as necessary).

Figure 2:
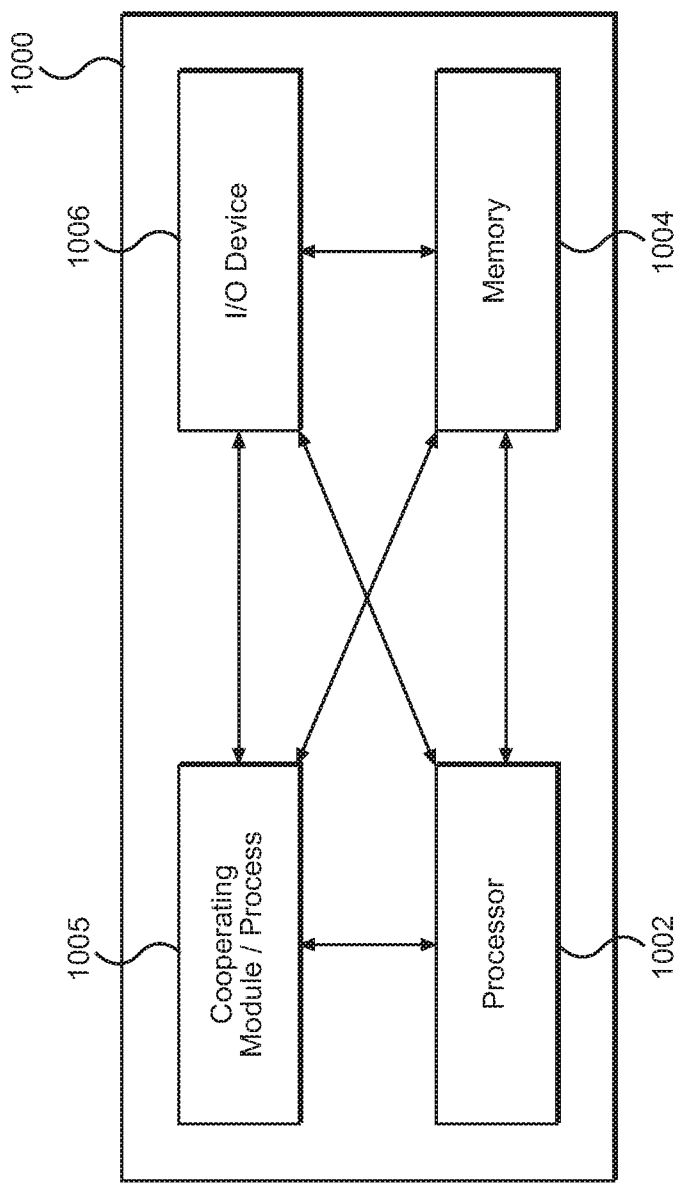
FIG. 2 provides a general architecture and functionality suitable for implementing functional elements described herein or portions of functional elements described herein.

FIG. 2 depicts a high-level block diagram of a computer, computing or electronic device suitable for use in implementing, inter alia, originating USP endpoints and receiving USP endpoints (e.g., agents and controllers), as well as gateways, MTP proxies, and the like.

Referring to FIG. 2, the computer 1000 includes one or more processors 1002 (e.g., a central processing unit (CPU) or other suitable processor(s)) and a memory 1004 (e.g., random access memory (RAM), read only memory (ROM), and the like). The computer 1000 also may include a cooperating module/process 1005. The cooperating process 1005 may be loaded into memory 1004 and executed by the processor 1002 to implement functions as discussed herein and, thus, cooperating process 1005 (including associated data structures) may be stored on a computer readable storage medium (e.g., RAM memory, magnetic or optical drive or diskette, or the like). At an originating endpoint, the memory 1004 may include the payload transmit buffer, the outgoing transmit buffer, and the like. At a receiving endpoint, the memory 1004 may include buffer memories, such as the receiving USP record buffer, the outgoing transmit buffer, the payload transmit buffer, the payload segment buffer, and the like.

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

Although discussed herein with regard to an example in which the controller 102 serves as the originating USP endpoint, and the agent 106 serves as the receiving USP endpoint, example embodiments should not be limited to this example. Rather, the agent 106 may serve as the originating USP endpoint (e.g., be configured to perform the functionality discussed above with regard to FIGS. 3 and 5, in addition to the functionality discussed above with regard to FIGS. 4A and 4B), and the controller 102 may serve as the receiving USP endpoint (e.g., be configured to perform the functionality discussed with regard to FIGS. 4A and 4B in addition to the functionality discussed above with regard to FIGS. 3 and 5). That is, for example, each of the controller 102 and the agent 106 may have the functionality discussed herein with regard to FIGS. 3, 4A, 4B and 5.

Although example embodiments are primarily discussed herein with regard to a USP message represented by a payload portion at an originating USP endpoint, and then recovered at the receiving USP endpoint, example embodiments should not be limited to this example. Rather, the payload portion may include and/or carry any originating payload information (e.g., TLS records needed for a TLS handshake, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing endpoints, clients, gateways, nodes, agents, controllers, computers, cloud based servers, web servers, proxies or proxy servers, application servers, and the like. As discussed later, such existing hardware may include, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, clients, gateways, nodes, agents controllers, computers, cloud based servers, web servers, application servers, proxies or proxy servers, and the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

The endpoints, clients, gateways, nodes, agents, controllers, computers, cloud based servers, web servers, application servers, proxies or proxy servers, and the like, may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more network elements, such as switches, gateways, termination nodes, controllers, servers, clients, and the like.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A method comprising:
processing a User Services Platform message to generate a plurality of payload records;
segmenting a payload record among the plurality of payload records to generate a plurality of payload record segments;
generating a sequence of User Services Platform records including the plurality of payload record segments, a User Services Platform record in the sequence of User Services Platform records including (i) at least one payload record segment from among the plurality of payload record segments, (ii) a payload segmentation and reassembly state, and (iii) a payload record segmentation and reassembly state,
setting the payload segmentation and reassembly state for the User Services Platform record to one of begin, in-process or complete based on a position of the User Services Platform record in the sequence of User Services Platform records;
setting the payload record segmentation and reassembly state for the User Services Platform record to one of begin, in-process or complete based on whether the User Services Platform record contains an initial one of the plurality of payload record segments, a final one of the plurality of payload record segments, or a payload record segment between the initial and final ones of the plurality of payload record segments; and
transmitting the sequence of User Services Platform records.

2. The method of claim 1, wherein a size of the User Services Platform record is based on a size of a non-payload portion of the User Services Platform record and a maximum transmission unit associated with a Message Transfer Protocol used to transmit the sequence of User Services Platform records.

3. The method of claim 1, wherein
the payload segmentation and reassembly state indicates a state of segmentation of the User Services Platform message when the User Services Platform record was generated, and
the payload record segmentation and reassembly state indicates a state of segmentation of the payload record when the User Services Platform record was generated.

4. The method of claim 3, wherein the User Services Platform record includes a Transport Layer Security entity.

5. The method of claim 1, wherein the User Services Platform record includes a single payload record segment, the single payload record segment corresponding to a single payload record representing the User Services Platform message.

6. The method of claim 1, wherein the User Services Platform message is one of unencrypted or encrypted with Concise Binary Object Representation (CBOR) Object Signing and Encryption (COSE).

7. The method of claim 1, wherein the User Services Platform record in the sequence of User Services Platform records further includes a session identifier indicating a session context for the sequence of User Service Platform records;
a User Services Platform record sequence identifier; and
an expected sequence identifier indicating a next sequence identifier expected to be received at an electronic device.

8. A method comprising:
receiving a sequence of a plurality of User Services Platform records, each User Services Platform record in the sequence of a plurality of User Services Platform records including (i) at least one payload record segment from among a plurality of payload record segments, the at least one payload record segment representing at least a portion of a User Services Platform message, (ii) a payload segmentation and reassembly state, and (iii) a payload record segmentation and reassembly state; wherein
the payload segmentation and reassembly state is set to one of begin, in-process or complete based on a position of the User Services Platform record in the sequence of a plurality of User Services Platform records, and
the payload record segmentation and reassembly state is set to one of begin, in-process or complete based on whether the User Services Platform record contains an initial one of the plurality of payload record segments, a final one of the plurality of payload record segments, or a payload record segment between the initial and final ones of the plurality of payload record segments;
buffering received User Services Platform records in the sequence of a plurality of User Services Platform records; and
recovering the User Services Platform message by reassembling payload record segments included in the received User Services Platform records in the sequence of a plurality of User Services Platform records in response to receiving a User Services Platform record in the sequence of a plurality of User Services Platform records including a payload record segmentation and reassembly state set to complete.

9. The method of claim 8, wherein
the payload segmentation and reassembly state included in a first User Services Platform record in the sequence of a plurality of User Services Platform records indicates a state of segmentation of the User Services Platform message when the first User Services Platform record was generated, and
the payload record segmentation and reassembly state included in the first User Services Platform record indicates a state of segmentation of a payload record when the first User Services Platform record was generated.

10. The method of claim 9, wherein each User Services Platform record in the sequence of a plurality of User Services Platform records includes a Transport Layer Security entity.

11. The method of claim 8, wherein at least a first User Services Platform record in the sequence of a plurality of User Services Platform records includes a single payload record segment corresponding to a single payload record representing the User Services Platform message.

12. The method of claim 8, wherein each User Services Platform record further includes
a session identifier indicating a session context for the sequence of a plurality of User Service Platform records;

a User Services Platform record sequence identifier; and an expected sequence identifier indicating a next sequence identifier expected to be received at an electronic device from which the sequence of a plurality of User Services Platform records were transmitted.

13. The method of claim 8, wherein the User Services Platform message is one of unencrypted or encrypted with Concise Binary Object Representation (CBOR) Object Signing and Encryption (COSE).

14. An electronic device comprising:
   at least one processor; and
   at least one memory including computer program code, the at least one memory and the computer program code configured to, with the at least one processor, cause the electronic device to
      segment a payload representing a User Services Platform message to generate a plurality of payload segments,
      generate a sequence of User Services Platform records based on the plurality of payload segments, each of the User Services Platform records including (i) a payload segment from among the plurality of payload segments and (ii) segmentation and reassembly state information indicating a state of segmentation of the payload at the electronic device when the included payload segment was generated, and
      transmit the sequence of User Services Platform records.

15. The electronic device of claim 14, wherein the plurality of payload segments have sizes based on sizes of non-payload portions of the User Services Platform records and a maximum transmission unit associated with a Message Transfer Protocol used to transmit the sequence of User Services Platform records.

16. The electronic device of claim 14, wherein the state of segmentation is one of begin, in-process and complete.

17. The electronic device of claim 14, wherein
   the payload includes at least a first payload record and a second payload record, the first payload record and the second payload record together representing at least a portion of the User Services Platform message;
   the plurality of payload segments includes a plurality of first payload segments and a plurality of second payload segments; and
   the at least one memory and the computer program code are configured to, with the at least one processor, cause the electronic device to segment the first payload record into the plurality of first payload segments and to segment the second payload record into the plurality of second payload segments.

18. The electronic device of claim 17, wherein the segmentation and reassembly state information for a first payload segment, among the plurality of first payload segments, includes
   a first payload segmentation and reassembly state indicating the state of segmentation of the payload when the first payload segment was generated, and
   a first payload record segmentation and reassembly state indicating a state of segmentation of the first payload record when the first payload segment was generated.

19. The electronic device of claim 18, wherein the first payload segmentation and reassembly state indicates one of
   a start of the segmentation of the payload at the electronic device, and
   an end of the segmentation of the payload at the electronic device.

20. The electronic device of claim 18, wherein the first payload record segmentation and reassembly state indicates one of
   a start of the segmentation of the first payload record at the electronic device, and
   an end of the segmentation of the first payload record at the electronic device.

21. The electronic device of claim 18, wherein each of the first payload record and the second payload record includes a Transport Layer Security entity.

22. The electronic device of claim 14, wherein the payload includes a single payload record representing the User Services Platform message.

23. The electronic device of claim 14, wherein the User Services Platform message is one of unencrypted or encrypted with Concise Binary Object Representation (CBOR) Object Signing and Encryption (COSE).

24. An electronic device, comprising:
   at least one processor; and
   at least one memory including computer program code, the at least one memory and the computer program code configured to, with the at least one processor, cause the electronic device to
      receive a sequence of a plurality of User Services Platform records, each of the plurality of User Services Platform records including (i) a payload segment representing a portion of a User Services Platform message, and (ii) segmentation and reassembly state information indicating a state of segmentation of a payload into payload segments at an originating endpoint device,
      buffer the plurality of User Services Platform records, and
      recover the User Services Platform message by reassembling the payload segments of the plurality of User Services Platform records in the buffer in response to receiving a User Services Platform record including segmentation and reassembly state information indicating that segmentation of the payload at the originating endpoint device is complete.

25. The electronic device of claim 24, wherein the segmentation and reassembly state information for each User Services Platform record indicates that the state of the segmentation of the payload is one of begin, in-process and complete.

26. The electronic device of claim 24, wherein
   the payload includes at least a first payload record;
   a first of the plurality of User Services Platform records includes (i) a first segment of the first payload record and (ii) first segmentation and reassembly state information; and
   the first segmentation and reassembly state information includes
      a first payload segmentation and reassembly state indicating the state of segmentation of the payload when the first segment of the first payload record was generated, and
      a first payload record segmentation and reassembly state indicating the state of segmentation of the first payload record when the first segment of the first payload record was generated.

27. The electronic device of claim 26, wherein at least one of
   the first payload segmentation and reassembly state indicates a start of segmentation of the payload at the originating endpoint device, or the first payload record segmentation and reassembly state indicates a start of segmentation of the first payload record at the originating endpoint device.

28. The electronic device of claim 26, wherein the first payload record includes a Transport Layer Security entity.

29. The electronic device of claim 24, wherein the payload includes a single payload record representing a User Services Platform message.

30. The electronic device of claim 24, wherein the User Services Platform message is one of unencrypted or encrypted with Concise Binary Object Representation (CBOR) Object Signing and Encryption (COSE).

* * * * *